E. L. MARSHALL.
ELECTRIC BATTERY.
APPLICATION FILED FEB. 18, 1915.
1,434,303.
Patented Oct. 31, 1922.
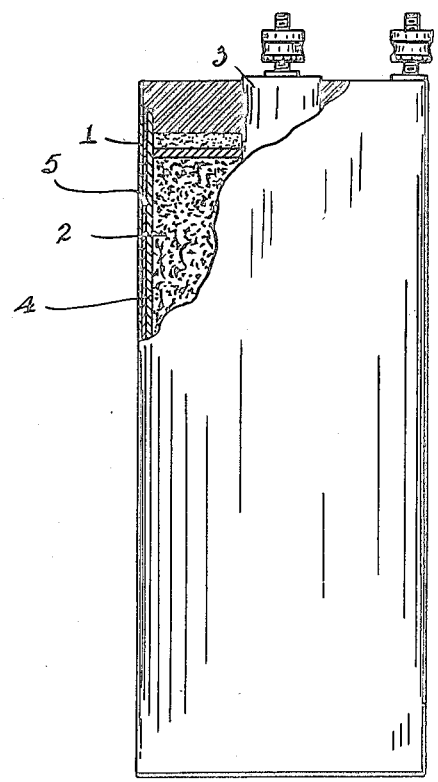
INVENTOR.
E. L. MARSHALL
BY J. J. Adams.
ATTORNEY Patented Oct. 31, 1922.

1,434,303

UNITED STATES PATENT OFFICE.

EDWARD L. MARSHALL, OF FREMONT, OHIO, ASSIGNOR, BY MESNE ASSIGNMENTS, TO NATIONAL CARBON COMPANY, INC., A CORPORATION OF NEW YORK.

ELECTRIC BATTERY.

Application filed February 18, 1915. Serial No. 9,185.

*To all whom it may concern:*

Be it known that I, EDWARD L. MARSHALL, a citizen of the United States, residing at Fremont, in the county of Sandusky and State of Ohio, have invented a certain new and useful Improvement in Electric Batteries, of which the following is a full, clear, and exact description.

My invention relates to electric batteries, and more particularly to dry cells.

Dry cells consist usually of a zinc can with a central carbon electrode and a mix packed between the two. It is necessary to keep the depolarizer in the mix from reaching the zinc can, and therefore it has been the practice to put a porous separating medium between the zinc and the mix. This medium is made of cheese cloth in some cases, and of blotting paper, pulpboard or strawboard in others.

The porous medium also acts as a reservoir for the electrolyte, but inasmuch as all such bibulous linings or separating mediums are of uneven surface, the zinc will not be in uniform contact therewith. To make the contact uniform and secure equal consumption of the zinc along its entire surface, it has been the practice to put cooked flour paste or cooked starch between the lining and the zinc. This not only fills in the uneven places in such linings, but it also acts as a diffusing body for the zinc salts formed during the action of the battery whereby crystallization on the zinc is retarded or prevented.

I have found that the paste in a dry cell slowly diffuses through the lining and gets beyond the region where it can perform its useful function. This causes the life of the cell to be shortened, both on shelf and in service. In attempting to prevent this, I have found that if the paste is left in the raw, uncooked condition, it diffuses much more slowly through the lining, and therefore it is retained in the desired place. Consequently the use of uncooked paste causes a remarkable increase in the shelf life and service life of the cell.

Uncooked paste of flour and water is somewhat difficult to handle in applying the same to the dry cell, and therefore I sometimes add a small quantity of cooked paste to stiffen the same and make it easier to handle. For this reason more or less of cooked paste can be added if desired.

The uncooked paste can be applied to wet linings in the usual way, but it is preferably applied to a dry lining and then thoroughly dried. The dry lining is then placed in the battery can, wetted with water or electrolyte, and the cell is finished in the usual way.

I believe that I am the first to discover that raw, uncooked paste of flour or starchy material is beneficial in dry cell manufacture, and my invention is not to be limited to any particular lining or separating medium, as such paste can perform its function regardless of the separating medium.

Referring to the single figure of the drawing, the zinc can 1 contains the mix 2 packed around a carbon electrode 3, the zinc being separated from the mix by a bibulous lining 4 which has a coating 5 of the paste referred to.

Having described my invention, what I claim is:

1. In a dry cell of the carbon-manganese peroxide type, a container electrode, a porous paper lining adjacent thereto, and raw, uncooked flour between the container and said lining.

2. In a dry cell, a container electrode, a central electrode, depolarizing mix around the central electrode, a porous envelope surrounding said mix, and uncooked flour paste in contact with the inner surface of the container electrode and with the porous envelope.

In testimony whereof, I hereunto affix my signature.

EDWARD L. MARSHALL.

Witnesses:
 IRA J. ADAMS,
 H. G. GROVER.